US010352538B2

(12) United States Patent
Pan et al.

(10) Patent No.: US 10,352,538 B2
(45) Date of Patent: Jul. 16, 2019

(54) SWINGING LED LAMP WITH WIRELESS CHARGING FUNCTION

(71) Applicant: MEGAPOWER PRODUCT COMPANY LIMITED, Foshan (CN)

(72) Inventors: Yan Pan, Wuxi (CN); Xin Chen, Foshan (CN)

(*) Notice: Subject to any disclaimer, the term of this patent is extended or adjusted under 35 U.S.C. 154(b) by 0 days.

(21) Appl. No.: 15/653,499

(22) Filed: Jul. 18, 2017

(65) Prior Publication Data

US 2018/0340678 A1 Nov. 29, 2018

(30) Foreign Application Priority Data

May 26, 2017 (CN) .................... 2017 2 0600487 U
May 26, 2017 (CN) .................... 2017 2 0606310 U

(51) Int. Cl.
| | |
|---|---|
| *F21L 4/08* | (2006.01) |
| *F21V 21/14* | (2006.01) |
| *F21S 6/00* | (2006.01) |
| *F21S 10/04* | (2006.01) |
| *H02J 50/10* | (2016.01) |
| *H04B 5/00* | (2006.01) |
| *F21W 121/00* | (2006.01) |
| *F21Y 115/10* | (2016.01) |

(52) U.S. Cl.
CPC ............. *F21V 21/14* (2013.01); *F21L 4/08* (2013.01); *F21S 6/001* (2013.01); *F21S 10/046* (2013.01); *H02J 50/10* (2016.02); *H04B 5/0037* (2013.01); *F21W 2121/00* (2013.01); *F21Y 2115/10* (2016.08)

(58) Field of Classification Search
CPC ........ F21S 10/04; F21S 10/043; F21S 10/046; F21S 10/063; F21S 10/066; H04B 5/0037
See application file for complete search history.

(56) References Cited

U.S. PATENT DOCUMENTS

| | | | | |
|---|---|---|---|---|
| 3,639,749 A | * | 2/1972 | Beckman .............. | F21S 10/04 362/392 |
| 2006/0034100 A1 | * | 2/2006 | Schnuckle ............. | B44C 5/06 362/161 |
| 2014/0362592 A1 | * | 12/2014 | Lee ...................... | F21S 10/046 362/386 |
| 2015/0362142 A1 | * | 12/2015 | Patton ................. | F21V 33/0052 362/284 |
| 2016/0146414 A1 | * | 5/2016 | Dong ................... | F21S 10/046 362/232 |
| 2017/0122511 A1 | * | 5/2017 | Ding ..................... | F21S 6/001 |

* cited by examiner

*Primary Examiner* — Zheng Song
(74) *Attorney, Agent, or Firm* — Erson IP (Nelson IP)

(57) ABSTRACT

A swinging LED lamp with a wireless charging function comprises a fixing portion and a magnetic suspension portion, wherein the fixing portion comprises a base and a lug boss formed at an upper end of the base; a main control circuit board and a power source end are arranged in the base; an electromagnet and a transmitting coil are arranged in the lug boss; the electromagnet and the transmitting coil are electrically connected with the power source end through the main control circuit board respectively.

13 Claims, 6 Drawing Sheets

SWINGING LED LAMP WITH WIRELESS CHARGING FUNCTION

CROSS-REFERENCE TO RELATED APPLICATIONS

This application claims priority to Chinese Patent Application No. 201720600487.6 with a filing date of May 26, 2017 and No. 201720606310.7 with a filing date of May 26, 2017. The content of the aforementioned applications, including any intervening amendments thereto, are incorporated herein by reference.

TECHNICAL FIELD

The utility model relates to an LED lamp, in particular to a swinging LED lamp with a wireless charging function.

BACKGROUND OF THE PRESENT INVENTION

An LED bulb of an existing magnetic suspension LED lamp is suspended on a base only by using magnetic force provided by the base. In order to supply power to LED lamp beads in the LED bulb, the following two ways are generally adopted: the LED bulb is connected with a power source end in the base by a power wire to realize wired power supply, or a button hole battery is arranged in the LED bulb to realize power supply. The former way is a wired power supply way with the power wire, which reduces the sense of science and technology of the magnetic suspension LED lamp. The latter way increases the weight of the LED bulb, causing that the magnetic force on the base is hard to keep the LED bulb in a suspension state when the quantity of electricity in the internal button hole battery is decayed.

In addition, the existing magnetic suspension LED lamp cannot realize a dynamic swinging effect, and generally adopts the white-light LED as a light source, causing single light emission and no change in light-emitting colors.

A wireless charging technology is a novel charging technology that emerges in recent years. The wireless charging technology based on an electromagnetic induction principle is already mature currently. The technology provides a preferred solution for wireless charging of portable electronic equipment.

An RGB mode (red, green and blue) is a color standard in industry. Various colors are obtained by changing and superposing three color channels of red (R), green (G) and blue (B). At present, an RGB-light LED light-emitting component is already matured, and can achieve flexible conversion of the light-emitting colors.

In addition, LED lamps in the prior art only have a lighting function, thereby causing a single function and lacking of the sense of science and technology and the interest. In addition, the existing LED lamps generally adopt a monochromatic LED as the light source, which emits single light and cannot realize flexible adjustment of the light-emitting colors.

SUMMARY OF PRESENT INVENTION

In order to solve the above technical problems, the purpose of the utility model is to provide a swinging LED lamp with a projection function. A specific technical solution is as follows:

A swinging LED lamp with a wireless charging function comprises: a fixing portion comprising: a base and a lug boss formed at an upper end of the base, wherein a main control circuit board and a power source end are arranged in the base; an electromagnet and a transmitting coil are arranged in the lug boss; the electromagnet and the transmitting coil are electrically connected with the power source end through the main control circuit board respectively; the lug boss is connected with a fixed ring perpendicular to the lug boss; and a spike is formed at a top end of the fixed ring. The swinging LED lamp also comprises a magnetic suspension portion comprising a pendant, a floating ring and a lamp base, wherein the pendant is connected to a bottom end of the floating ring; the lamp base is connected to a top end of the floating ring; a permanent magnet and a receiving coil are arranged in the pendant; an LED control circuit board and a first LED bulb electrically connected with the LED control circuit board are arranged on an upper end surface of the lamp base; the LED control circuit board is electrically connected with the receiving coil; a groove used in combination with the spike is formed in a central position of a lower end surface of the lamp base; a width of the groove is greater than that of the spike; a depth of the groove is smaller than a height of the spike; and after the spike enters the groove, the spike and the groove form point contact. The floating ring is sleeved on the fixed ring; the lamp base is located above the fixed ring; the pendant is located above the lug boss; and the permanent magnet and the electromagnet in a power-on state are mutually exclusive.

In a specific embodiment, the first LED bulb comprises a lampshade and an LED light-emitting component arranged in the lampshade; the LED light-emitting component is electrically connected with an LED control circuit; the LED control circuit is connected with a receiving antenna; the receiving antenna is used for receiving a control signal emitted by an external control terminal; and the control circuit controls a light-emitting state of the LED light-emitting component based on the received control signal.

In a specific embodiment, the LED light-emitting component comprises a white-light LED and an RGB-light LED group; and the LED control circuit controls a lighting combination of the white-light LED and the RGB-light LED group to control the light-emitting state of the LED light-emitting component.

In a specific embodiment, a diffuse reflection part is arranged on the upper end surface of the pendant; second LED bulbs are symmetrically arranged on a left side and a right side of the fixed ring; and the second LED bulbs are electrically connected with the LED control circuit board.

In a specific embodiment, the diffuse reflection part is an artificial diamond.

In a specific embodiment, the power source end is connected with an external DC (Direct Current) power source.

In a specific embodiment, the power source end is connected with a storage battery arranged in the base.

In a specific embodiment, the swinging LED lamp further comprises a housing for accommodating the fixing portion and the magnetic suspension portion.

In a specific embodiment, the swinging LED lamp further comprises a laser projection lamp arranged on the base and located in the housing; and the laser projection lamp is electrically connected with the main control circuit board.

In a specific embodiment, the laser projection lamp comprises a detachable housing having an opened upper end as well as a projection sheet and a laser tube arranged in the detachable housing; the laser tube is located below the projection sheet; and the laser tube is electrically connected with the main control circuit board.

In a specific embodiment, the detachable housing comprises a side wall and a bottom portion; an annular clamping groove protruding outwards is formed in the middle of the side wall; a through hole is formed in the bottom portion; the projection sheet is clamped in the clamping groove; and the laser tube is penetrated into the bottom portion through the through hole.

In a specific embodiment, the housing is a plastic housing.

In a specific embodiment, the housing is a paraffin housing.

Compared with the prior art, the utility model has the following beneficial effects: 1. a magnetic suspension technology is used to suspend a suspension induction bulb, and a wireless charging technology is adopted to supply power to the LED lamp, so that the LED lamp of the utility model has the sense of science and technology; 2. the suspension induction bulb can realize low-amplitude swinging in a balanced state, thereby generating a dynamic light-emitting effect and increasing the interest of the utility model; and 3. a lighting function and a laser projection function are integrated to help to enhance the sense of science and technology and the interest of the LED lamp.

DESCRIPTION OF THE DRAWINGS

In order to describe the technical solution of embodiments of the utility model more clearly, drawings to be used in the embodiments are introduced briefly below. Apparently, the drawings described below are only some embodiments of the utility model, and those ordinary skilled in the art can also acquire other drawings according to these drawings without contributing creative work, wherein.

FIG. 1 to FIG. 6 comprise a fixing portion 1, a base 11, a lug boss 12, a fixed ring 13, a spike 14, an electromagnet 15, a transmitting coil 16, a main control circuit board 17, a power source end 18, a second LED bulb 19, a magnetic suspension portion 2, a pendant 21, a floating ring 22, a lamp base 23, a first LED bulb 24, a groove 25, a permanent magnet 26, a receiving coil 27, an artificial diamond 28, a laser projection lamp 3, a detachable housing 31, a projection sheet 311, a clamping groove 312, a laser tube 313, a through hole 314, a lead wire 32, a light-transmitting mirror 33 and a housing 4.

DETAILED DESCRIPTION OF PREFERRED EMBODIMENTS

Figure 1:
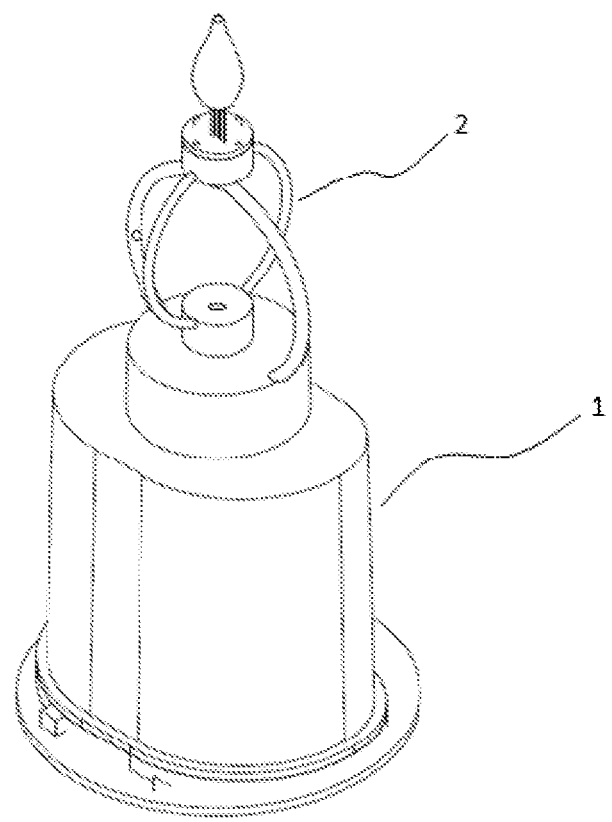
FIG. 1 is a schematic diagram of a connection structure of a fixing portion and a suspension portion in the utility model.
Figure 2:
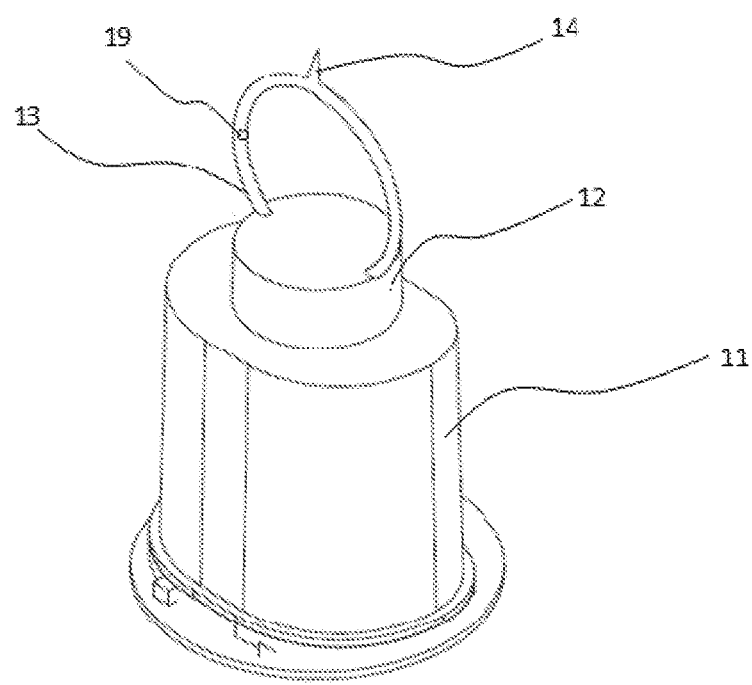
FIG. 2 is a structural schematic diagram of a fixing portion in FIG. 1.
Figure 3:
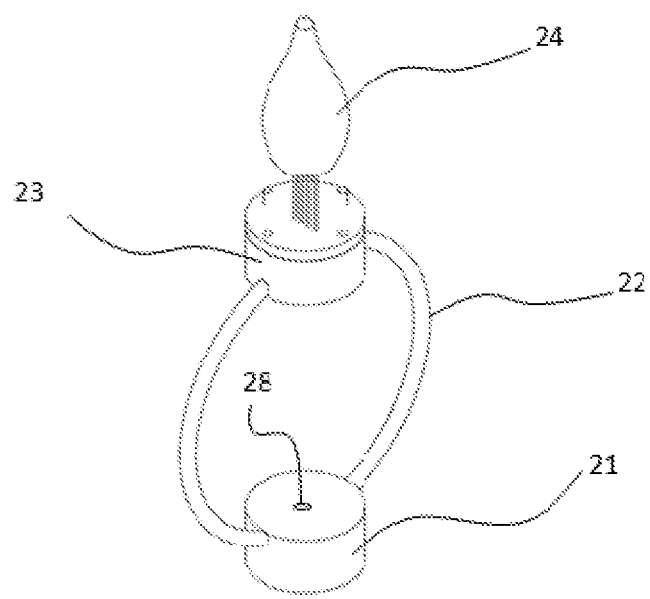
FIG. 3 is a structural schematic diagram of a magnetic suspension portion in FIG. 1.
Figure 4:
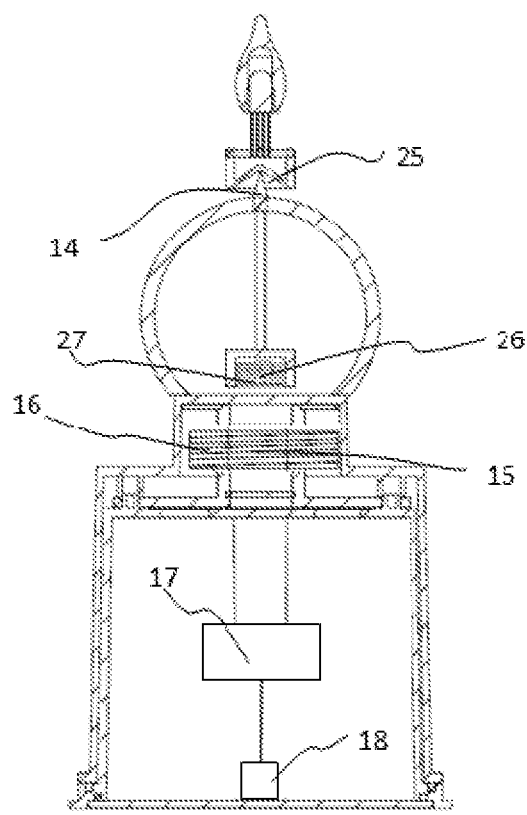
FIG. 4 is a schematic diagram (section view) of an internal structure of a fixing portion and a suspension portion in the utility model.

In order to make the above purpose, features and advantages of the utility model more apparent and easier to understand, the utility model is further described in detail below in combination with the drawings and specific embodiments.

As shown in FIG. 1 to FIG. 4, in a specific embodiment, a swinging LED lamp with a wireless charging function provided by the utility model comprises a fixing portion 1 and a magnetic suspension portion 2, wherein the fixing portion 1 comprises a base 11 and a lug boss 12 formed at an upper end of the base 11. A main control circuit board 17 and a power source end 18 are arranged in the base 11. An electromagnet 15 and a transmitting coil 16 are arranged in the lug boss 12. The electromagnet 15 and the transmitting coil 16 are electrically connected with the power source end 18 through the main control circuit board 17, respectively. The lug boss 12 is connected with a fixed ring 13 perpendicular to the lug boss 12. A spike 14 is formed at a top end of the fixed ring 13.

In the present embodiment, the power source end 18 is connected with a storage battery (not shown) arranged in the base 11. The main control circuit board 17 processes current outputted by the storage battery and then supplies the current to the electromagnet 15 and the transmitting coil 16. Certainly, in some other embodiments, the power source end 7 can also be connected with an external DC (Direct Current) or AC (Alternate Current) power source A control knob (not shown) is arranged on an outer wall of the base 11. The control knob is connected with the main control circuit board 17. The control knob is used for controlling the magnitude of the current outputted by the main control circuit board 17.

The magnetic suspension portion 2 comprises a pendant 21, a floating ring 22 and a lamp base 23. The pendant 21 is connected to a bottom end of the floating ring 22. The lamp base 23 is connected to a top end of the floating ring 22. A permanent magnet 26 and a receiving coil 27 are arranged in the pendant 21. An LED control circuit board (not shown) and a first LED bulb 24 electrically connected with the LED control circuit board are arranged on an upper end surface of the lamp base 23. The LED control circuit board is electrically connected with the receiving coil 27.

A groove 25 used in combination with the spike 14 is formed in a central position of a lower end surface of the lamp base 23.

A width of the groove 25 is greater than that of the spike 14. A depth of the groove 25 is greater than that of the spike 14. The spike 14 can enter the groove 25 and form point contact with the groove 25.

The floating ring 22 is sleeved on the fixed ring 13. The lamp base 23 is located above the fixed ring 13. The pendant 21 is located above the lug boss 12. The permanent magnet 26 and the electromagnet 15 in a power-on state are mutually exclusive.

When the electromagnet 15 is not powered on or the current flowing through the electromagnet 15 is less than a preset value, repulsive force between the permanent magnet 26 and the electromagnet 15 is smaller than self-gravity of the magnetic suspension portion 2. At this time, the lamp base 23 is supported at the upper end of the fixed ring 13; the spike 14 enters the groove 25 and forms the point contact with the groove 25; and the magnetic suspension portion 2 realizes low-amplitude swinging in a balanced state.

When the current flowing through the electromagnet 15 is greater than the preset value, the repulsive force between the permanent magnet 26 and the electromagnet 15 is greater than the self-gravity of the magnetic suspension portion 2. At this time, the lamp base 23 is suspended above the fixed ring 13.

The swinging LED lamp with the wireless charging function in the present embodiment further comprises a housing 4. The fixing portion 1 and the magnetic suspension portion 2 are located in the housing. In the present embodiment, the housing is a plastic housing. In some other embodiments, a paraffin housing, a glass housing and housings made of other materials can also be adopted. A hole matched with the lamp base is formed in the housing.

In the present embodiment, the first LED bulb 24 comprises a lampshade (not shown) and an LED light-emitting component (not shown) arranged in the lampshade. The LED light-emitting component is electrically connected with the LED control circuit board. The LED control circuit board is connected with a receiving antenna. The receiving antenna is used for receiving a control signal emitted by an external control terminal (e.g., a remote controller, a mobile phone, etc.). The control circuit board controls a light-emitting state of the first LED bulb 24 based on the received control signal. The light-emitting state comprises a light color and a light intensity.

Specifically, the LED light-emitting component comprises a white-light LED and an RGB-light LED group. The control terminal controls the lighting of RGB single-color light LED or the mixed-color lighting of RG, GB, RB and RGB-light LEDs in a remote control way, so as to realize color change and meet needs of different lighting occasions. Certainly, the white-light LED can be lighted only to meet normal lighting needs.

It should be noted that, the RGB color change of the LED light-emitting component is realized in the remote control way, which is a mature technology known by those ordinary skilled in the art and is not a novel technical solution to be protected by the utility model. Therefore, specific implementation processes are not described in detail in the present description. For example, a Chinese utility model patent (Publication Number: CN201836681U) discloses an LED lamp capable of remotely controlling RGB change, and provides a specific technical solution for performing different color lamp conversions on the LED lamp through a remote controller. The technical solution is also completely applicable to the utility model.

In order to improve the light-emitting effect of the utility model, in the present embodiment, an artificial diamond 28 is inlaid on the upper end surface of the pendant 21. Second LED bulbs 19 are symmetrically arranged on a left side and a right side of the fixed ring 13. The LED bulbs 19 are electrically connected with the LED control circuit board.

In the present embodiment, a structure of the second LED bulbs 19 is the same as that of the first LED bulb 24. The LED control circuit board synchronously controls the light-emitting state of the second LED bulbs 19 based on the received control signal emitted by the external terminal. The light emitted by the second LED bulbs 19 is subjected to diffuse reflection on the surface of the artificial diamond 28, thereby creating a brilliant and fantastic reflection halation. Certainly, in some other embodiments, crystal stones and other types of diffuse reflection parts can also be adopted.

Figure 5:
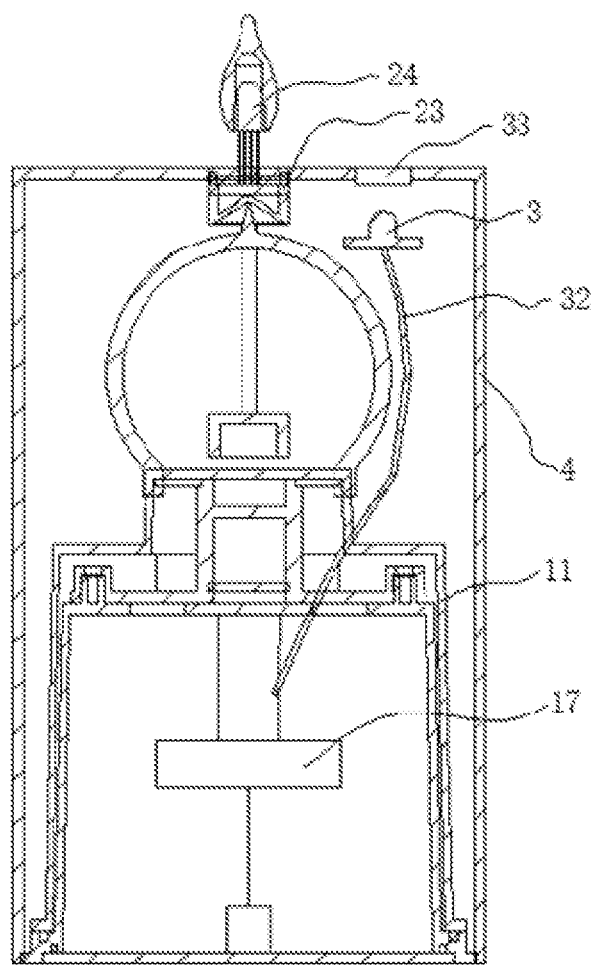
FIG. 5 is a schematic diagram (section view) of an internal structure of a laser projection lamp in the utility model.

In order to further enhance the sense of science and technology of a lamp body, by referring to FIG. 5, a laser projection lamp 3 is further arranged in the housing. The LED lamp 2 and the laser projection lamp 3 are arranged on the base 11 and are located in the housing 4. The LED lamp 2 and the laser projection lamp 3 are electrically connected with the main control circuit board 4 respectively. The main control circuit board 17 processes the current outputted by the power source end 18 and then supplies the current to the LED lamp 2 and the laser projection lamp 3.

In FIG. 5, in order to more clearly reflect the position of the laser projection lamp, some parts of the fixing portion and the magnetic suspension portion are omitted.

Figure 6:
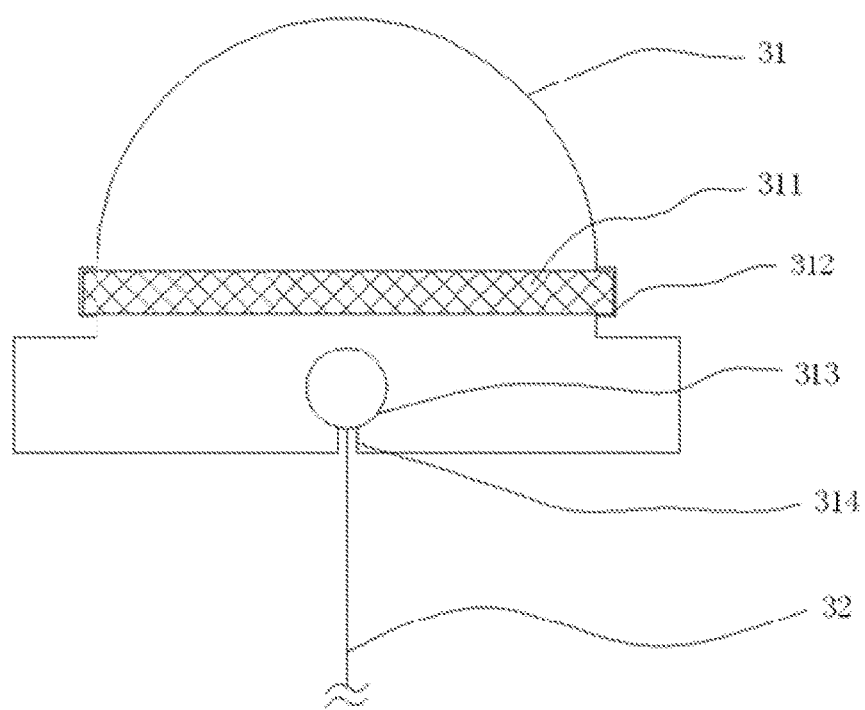
FIG. 6 is a schematic diagram of an amplified structure of a laser projection lamp in the utility model.

As shown in FIG. 6, the laser projection lamp 3 comprises the detachable housing 31 having an opened upper end as well as a projection sheet 311 and a laser tube 313 arranged in the detachable housing 31. The laser tube is located below the projection sheet. The laser tube 313 is electrically connected with the main control circuit board 17 through a lead wire 32. The projection sheet is made of a transparent material and is designed with patterns. When the laser tube is turned on, the patterns on the projection sheet can be projected onto the surface of an external object so as to produce a corresponding shade and shadow pattern on the surface of the object.

In the present embodiment, the detachable housing 31 comprises a side wall and a bottom portion. An annular clamping groove 312 protruding outwards is formed in the middle of the side wall. A through hole 314 is formed in the bottom portion. The projection sheet is clamped in the clamping groove 312. A lower end binding post of the laser tube penetrates through the through hole.

An opening 5 is formed in a housing position above the laser projection lamp, for emitting the light from the laser projection lamp upwards. The laser projection lamp is embedded at the housing position above the laser projection lamp through the detachable housing.

A use method and a working principle of the utility model are as follows:

An initial state: a standby state, in which the lamp base 23 is supported at the upper end of the fixed ring 13, and the spike 14 on the fixed ring 13 enters the groove 25 and forms the point contact with the groove 25.

When the LED lamp needs to be used, the control knob is rotated forward so that the main control circuit board 17 is connected with the power source end 18. The main control circuit board 17 supplies the current to the electromagnet 15. The electromagnet 15 produces a magnetic field. The magnetic field and the permanent magnet 26 are mutually exclusive. Meanwhile, an oscillation circuit on the main control circuit board 17 converts the DC into the AC and transmits the AC to the transmitting coil 16. The transmitting coil 16 generates an alternating magnetic field under the action of the AC. The receiving coil 27 generates electromagnetic induction under the action of the alternating magnetic field, generates the AC and conducts the AC to the LED control circuit board. Both the first LED bulb 24 and the second LED bulbs 19 electrically connected with the LED control circuit board emit light.

The light color and the light intensity of the light emitted by the first LED bulb 24 and the second LED bulbs 19 can be flexibly adjusted through remote control of the external control terminal to meet various lighting needs.

The magnitude of the current outputted by the main control circuit board 17 can be adjusted by adjusting a rotation amplitude of the control knob so as to control the state of the magnetic suspension portion 2. When the current outputted from the main control circuit board 17 is less than a preset value, the lamp base 23 is supported at the upper end of the fixed ring 13. The spike 14 on the fixed ring 13 enters the groove 25 of the lamp base 23 and forms the point contact with the groove 25. The magnetic suspension portion 2 realizes low-amplitude swinging in a balanced state, so that the suspension induction lamp 2 generates a dynamic light-emitting effect. When the current outputted from the main control circuit board 6 is greater than the preset value, the lamp base 23 is separated from the fixed ring 13 and is suspended above the fixed ring 13 to generate a suspension effect.

When the LED lamp needs to be turned off, the control knob is rotated reversely so that the main control circuit board 17 is disconnected from the power source end 18, the electromagnet 15 is de-energized, and the magnetic field on the electromagnet 15 exclusive with the permanent magnet 26 disappears correspondingly. Under the action of self-gravity, the lamp base 23 is returned to the upper end of the fixed ring 13. Meanwhile, the transmitting coil 16 loses the alternating magnetic field, the receiving coil 27 correspondingly loses the electromagnetic induction and does not generate the AC, and the first LED bulb 24 and the second LED bulbs 19 are de-energized to be turned off.

The utility model is described above in detail in a certain particularity. Those ordinary skilled in the art should understand that descriptions in embodiments are merely exemplary, and all changes made without departing from true spirits and a scope of the utility model should belong to the protection scope of the utility model. The protection scope required to be protected by the utility model is limited by claims, rather than the above descriptions in embodiments.

We claim:

1. A swinging LED lamp with a wireless charging function, comprising:
   a fixing portion comprising a base and a lug boss formed at an upper end of the base, wherein a main control circuit board and a power source end are arranged in the base; an electromagnet and a transmitting coil are arranged in the lug boss; the electromagnet and the transmitting coil are electrically connected with the power source end through the main control circuit board respectively; the lug boss is connected with a fixed ring perpendicular to the lug boss; and a spike is formed at a top end of the fixed ring; and
   a magnetic suspension portion comprising a pendant, a floating ring and a lamp base, wherein the pendant is connected to a bottom end of the floating ring; the lamp base is connected to a top end of the floating ring; a permanent magnet and a receiving coil are arranged in the pendant: an LED control circuit board and a first LED bulb electrically connected with the LED control circuit board are arranged on an upper end surface of the lamp base; the LED control circuit board is electrically connected with the receiving coil; a groove used in combination with the spike is formed in a central position of a lower end surface of the lamp base; a width of the groove is greater than a width of the spike; a depth of the groove is smaller than a height of the spike; and after the spike enters the groove, the spike and the groove form point contact, wherein
   the floating ring is sleeved on the fixed ring; the lamp base is located above the fixed ring; the pendant is located above the lug boss; and the permanent magnet and the electromagnet in a power-on state are mutually exclusive.

2. The LED lamp according to claim 1, wherein the first LED bulb comprises a lampshade and an LED light-emitting component arranged in the lampshade; the LED light-emitting component is electrically connected with an LED control circuit; the LED control circuit is connected with a receiving antenna; the receiving antenna is used for receiving a control signal emitted by an external control terminal; and the control circuit controls a light-emitting state of the LED light-emitting component based on the received control signal.

3. The LED lamp according to claim 2, wherein a diffuse reflection part is arranged on the upper end surface of the pendant; second LED bulbs are symmetrically arranged on a left side and a right side of the fixed ring; and the second LED bulbs are electrically connected with the LED control circuit board.

4. The LED lamp according to claim 3, wherein the diffuse reflection part is an artificial diamond.

5. The LED lamp according to claim 2, wherein the LED light-emitting component comprises a white-light LED and an RGB-light LED group; and the LED control circuit controls a lighting combination of the white-light LED and the RGB-light LED group to control a light-emitting state of the LED light-emitting component.

6. The LED lamp according to claim 1, wherein the power source end is connected with an external DC (Direct Current) power source.

7. The LED lamp according to claim 1, wherein the power source end is connected with a storage battery arranged in the base.

8. The LED lamp according to claim 1, wherein the LED lamp further comprises a housing for accommodating the fixing portion and the magnetic suspension portion.

9. The LED lamp according to claim 8, wherein the LED lamp further comprises a laser projection lamp arranged on the base and located in the housing, and the laser projection lamp is electrically connected with the main control circuit board.

10. The LED lamp according to claim 8, wherein the housing is a plastic housing.

11. The LED lamp according to claim 8, wherein the housing is a paraffin housing.

12. The LED lamp according to claim 1, wherein the laser projection lamp comprises a detachable housing having an opened upper end as well as a projection sheet and a laser tube arranged in the detachable housing; the laser tube is located below the projection sheet; and the laser tube is electrically connected with the main control circuit board.

13. The LED lamp according to claim 12, wherein the detachable housing comprises a side wall and a bottom portion; an annular clamping groove protruding outwards is formed in the middle of the side wall; a through hole is formed in the bottom portion; the projection sheet is clamped in the clamping groove; and the laser tube is penetrated into the bottom portion through the through hole.

* * * * *